United States Patent [19]

Muto

[11] Patent Number: 4,762,539
[45] Date of Patent: Aug. 9, 1988

[54] UNIVERSAL/SCRUBBER/PRECIPITATOR FOR SCRUBBING SMOKE

[76] Inventor: Rudolph Muto, 24 William St., Andover, Mass. 01810

[21] Appl. No.: 924,918

[22] Filed: Oct. 30, 1986

[51] Int. Cl.⁴ .......................................... B01D 47/00
[52] U.S. Cl. ...................................... 55/232; 55/234; 55/260; 261/92
[58] Field of Search ................................ 55/230–232, 55/234, 260; 261/84, 92, 90

[56] References Cited

U.S. PATENT DOCUMENTS

| 462,102 | 10/1891 | Schmid | 261/92 |
|---|---|---|---|
| 993,009 | 5/1911 | Winkler | 55/232 |
| 2,281,616 | 5/1942 | Placek | 261/83 |
| 2,522,905 | 9/1950 | Smith | 55/232 |
| 2,551,227 | 5/1951 | Yost | 55/232 |

FOREIGN PATENT DOCUMENTS 2057290 4/1981 United Kingdom .................. 55/234

Primary Examiner—Bernard Nozick
Attorney, Agent, or Firm—Pearson & Pearson

[57] ABSTRACT

A universal/scrubber/precipitator comprises at least one, or a plurality of rolls or circular cylinders concentric and rotatable in one direction about their common axis. The rolls are perforate with perforations less each in span than the span supported by the surface tension of the liquid in a liquid bath in which the drums are partially immersed. Each roll has a plurality of cups at least one each 180 degrees about the roll, extending from one axial end to the other. The rolls are sealed at their ends to prevent leakage of smoke, and also at the top of a main deceleration chamber having a plurality of deceleration chambers and a plurality of deflectors, and a condensation chamber. Smoke is propelled from the inlet deceleration chamber through the perforations, and then to the other deceleration chambers, as the roll rotates, the cups being faced to pick up liquid from the liquid bath and spill or discharge liquid as they reach the top, and ascending water curtains are formed as the liquid is splashed against buffers on each side of the roll. Therefore, the smoke and any other particles are forced to pass through the perforations of all the drums to the interior of the innermost drum and from there through the perforations of all the drums to the outermost drum and into the outlet deceleration chamber. Thus, the smoke is washed and cleaned as it passes through the wetted perforations.

The perforations should have less of a span than will be supported by the surface tension of the liquid, so that the perforations are closed with liquid if they are opened by the passage of smoke.

14 Claims, 6 Drawing Sheets

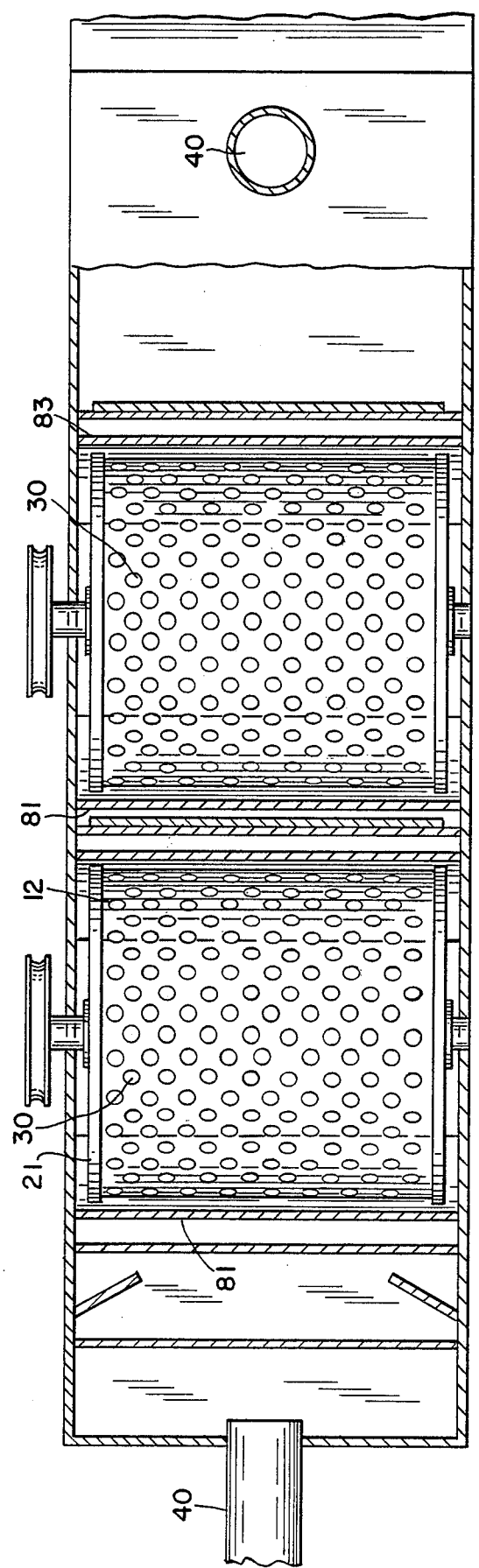

UNIVERSAL/SCRUBBER/PRECIPITATOR FOR SCRUBBING SMOKE

The invention relates to so-called scrubbers that is, devices for scrubbing smoke, or the like to remove undesired impurities such as carcinogens.

BACKGROUND OF THE INVENTION

There is a body of scientific belief that much air pollution results from smoke thrown into the air as a product of burning fuels, leading to acidification of rain and lake water, and the suspension of particulate matter in the air. Therefore, many believe that it is important for atmospheric purification to provide scrubbers for industrial smoke stacks. Many efforts have been made in the past to provide scrubbers of one kind or another to meet these objectives.

For example, as far back as Raymond, U.S. Pat. No. 467,264 Jan. 19, 1892, for "Method of Purifying Smoke" describes apparatus involving a spray of water and steam through which the smoke is circulated, particulate matter being wetted and thus dropped by gravity, and so washed from the smoke. Pridham, U.S. Pat. No. 554,348 Feb. 11, 1896 for "Smoke Condenser" describes a helical conveyor with a scoop to gather in water from an intake pool with which the smoke is to be commingled. After cleaning the wash water the smoke is discharged at an outlet pool, and the wash water is drawn off and fresh water is admitted to the intake pool from which the water is scooped.

Pridham, U.S. Pat. No. 601,677 Apr. 5, 1898 for "Method of and Apparatus for Condensing Fumes or Gases" suggests an archimedes pump for pumping wash water through a brush arrangement to form a spray, the smoke passing through several chambers to be washed and condensed by the spray water. Theisen, U.S. Pat. No. 709,527 Sept. 23, 1902 for "Process of Treating Gases" proposes a drum rotating in one direction into which gases are fed in one sense and water in another so that they counterflow along a thin film in a spiral path on the inner surface of the drum or casing. Sahlin, U.S. Pat. No. 804,677 Nov. 14, 1905, for "Gas Purifier" suggests a drum at the top of which jets of water 8 "play against the drum". The gas to be washed flows through different sections of the drums, passing through dividers wet by the spray.

Baldwin, U.S. Pat. No. 911,802 Feb. 9, 1909, for "Apparatus for Separating Heavy Particles from Air and Other Gases" proposes a blower forcing the gas to be treated through a wire mesh which is wet with water or steam to wash out the heavier particles. Flowwel, U.S. Pat. No. 916,647 June 29, 1909, for "Gas Purifier" suggests using a turbine wheel against which a water nozzle injects water to drive the wheel and collects the smoke to be cleaned by the water at the outlet of the turbine wheel. In Johnson, U.S. Pat. No. 1,289,797 Dec. 31, 1918 for "Smoke Washer" the patentee suggests conveying the smoke by a pipe to the bottom of a pool of water whence it rises to pass through vanes to commingle the by-products with the water to wash the smoke.

Schmieg, U.S. Pat. No. 2,212,752 Aug. 27, 1940, for "Method of and Apparatus for Removing Foreign Material from Air" describes a machine for washing smoke comprising a pool from which a rapidly rotating perforated wheel picks up liquid and throws the liquid against a curved member 68 to break up the liquid into a spray. The spray is thrown against a baffle from which it drains into the pool for re-circulation. The air to be cleaned is forced through the wheel perforations and through the spray for cleaning.

Getzin, et al, U.S. Pat. No. 3,252,691 May 24, 1966, for "Gas Cleaning Apparatus" shows a continuously driven porous medium belt which travels a horizontal, then an upward, and then a downward path. A spray of cleaning liquid is directed against the belt on its horizontal path and also as its path is changed from horizontal to upward. The gas to be cleaned is forced through the liquid moistened belt for cleaning. The medium of the belt 28 is described as of compressible-expansible elastic foam polyurethane material. Holler, Jr. U.S. Pat. No. 3,615,248 Oct. 26, 1971, for "Smoke Control System" describes a smoke filter comprising cartridge filters carried with other filter cartridges in a rotatable drum assembly. Each filter is rotated to a position wherein the gas passes through it for cleaning by a spray of water which may contain calcium carbonates, and then a succeeding filter is moved to the position to intercept the gas flow for cleaning, while the prior used filter cartridge is being cleaned. Gething, U.S. Pat. No. 3,714,764 Feb. 6, 1973, for "Boiler Flue Gas Scrubber" describes an apparatus in which the gas to be cleaned is driven to flow between a revolving helical auger-like member and a simultaneously revolving surrounding drum having a film of pollutant absorbing liquid disposed on its inner surface in counter flow to the gas. The liquid is carried into and out of a sump by means of pump vanes carried by the drum. The liquid may be chemically treated to react with various pollutants.

SUMMARY OF THE INVENTION

According to the invention, the universal scrubber precipitator comprises at least one roll and could have a plurality of co-axial rolls mounted for rotation in one direction about the same horizontal axis, or two rolls side by side synchronous and in sequence. If a plurality of rolls then one roll is radially spaced inside the next outer one in a housing. The rolls have perforations for the passage of the smoke, and or gas, and are only partially immersed in the bath. Cups carried by or between the rolls have concavities facing upward as they leave the bath and downward as they enter the bath in the direction of rotation, thereby to spill liquid over the rolls during rotation. The cups extend axially the full axial length of the rolls and are sealed at the ends against gas flow. Preferably, the perforations of the rolls are less than the maximum span supported by the surface tension of the liquid, and preferably the rolls are cylindrical and co-axial with the horizontal axis of rotation, and the cups are in the form of hemispherical cylinders axially extending the axial length of the rolls. The housing is divided into a plurality of deceleration chambers including an inlet deceleration chamber, and an outlet deceleration chamber. Deflectors provide a means to segregate the gas within the deceleration chambers. Other deflectors extending downward from the top of the housing proximate the rolls complete the division with a gas seal at the roll axial ends with the sides of the chamber. Means are provided to propel the smoke from the flue through the chambers so that the smoke enters the broad front side through perforations on the surface of the outermost roll and through the wetted perforations of each successive or synchronous rolls inwardly to the interior of the rolls, and thence out again through the wetted perforations to the exterior of the rolls to the outlet deflection chamber, whereby the smoke is washed and the impurities cleaned in the passage through the wetted perforations.

DESCRIPTION OF THE DRAWINGS

The various objects, advantages, and novel features of the invention will be more fully apparent from the following detailed description, when read in connection with the accompanying drawing, in which like reference characters refer to like parts, and in which:

FIG. 8 is a top view the embodiment of FIG. 6 showing two synchronous rolls.

DETAILED DESCRIPTION

Figure 1:
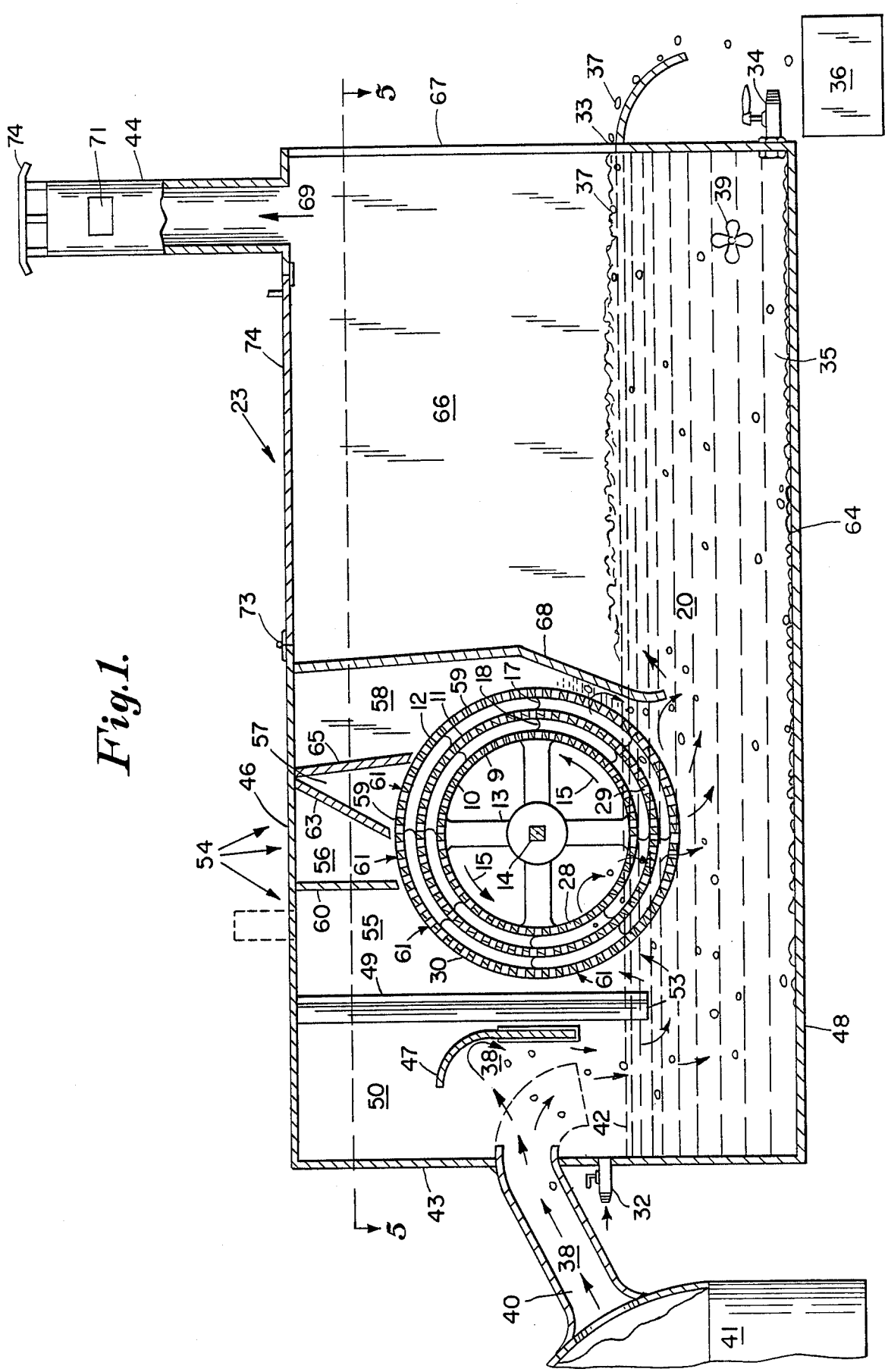
FIG. 1 is a side cross sectional view of an embodiment of the invention.
Figure 2:
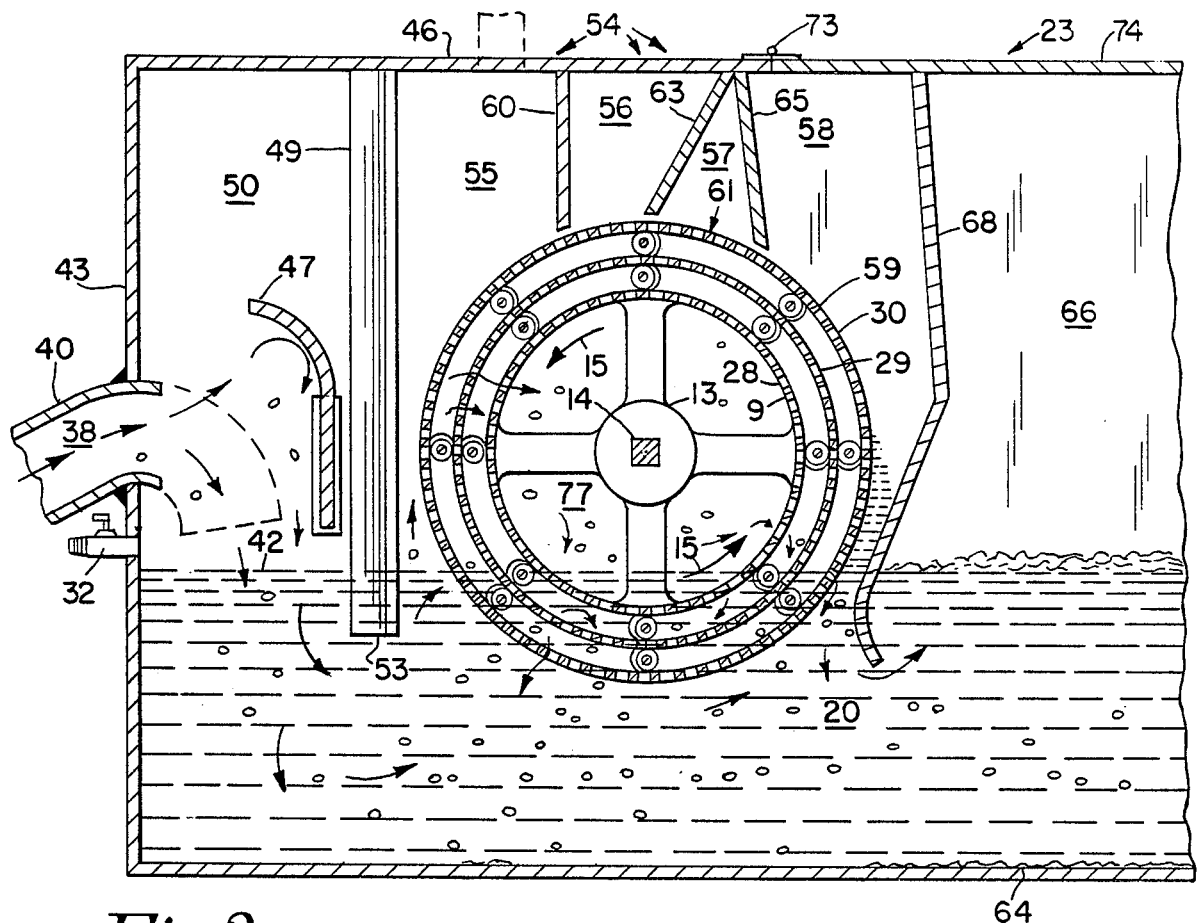
FIG. 2 is a side cross-sectional view, somewhat enlarged, of only a portion of FIG. 1.

The invention is called a Universal Scrubber/Precipitator For Scrubbing Smoke Or The Like because the scrubbing action eliminates the particles which pollute the air, which is due to the filtering process. The precipitator action combines the chemical by-products into inert material for removal.

Referring to the figures of the drawing at least one roll 9, or a plurality of rolls 10, 11, and 12 are co-axially mounted on a spider, or the like 13 for rotation counter-clockwise about an axis 14, and indicated by the arrows 15. The rolls 12 and 11 carry cups 17 fastened between these rolls; rolls 10 and 11 carry cups 18, fastened between rolls 10 and 11. The rolls 10, 11, and 12 are immersed only partially in a liquid bath 20, and do not extend to the bottom of the bath. The cups 17 and 18 have concavities facing up as they leave the bath 20 carried by the rolls 10, 11, and 12 in the direction of rotation, and down as they enter the bath 20 carried by the roll. The cups 17 and 18 may be hemispherical cylinders extending each the full axial length of the rolls.

Figure 4:
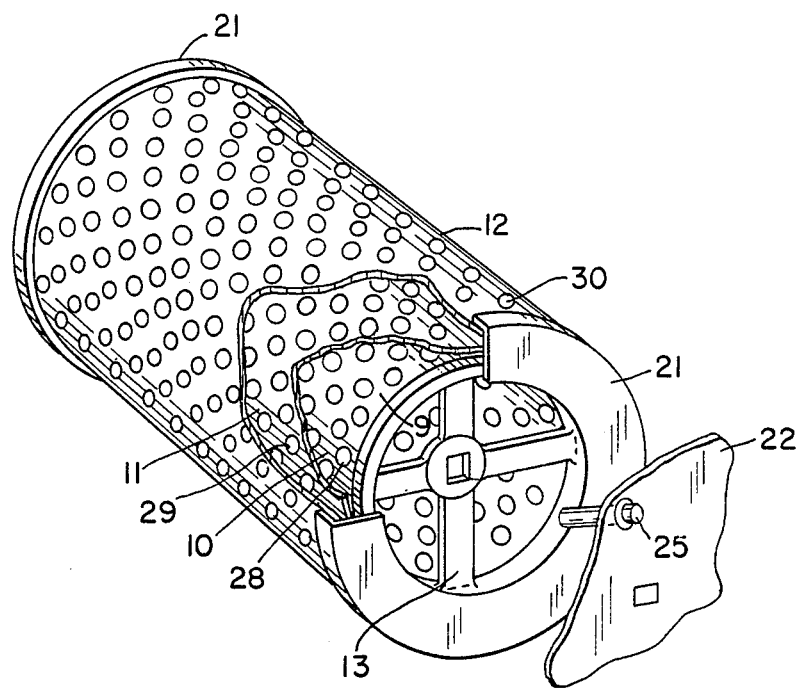
FIG. 4 is a perspective, somewhat schematic view of the rolls of FIG. 3.
Figure 5:
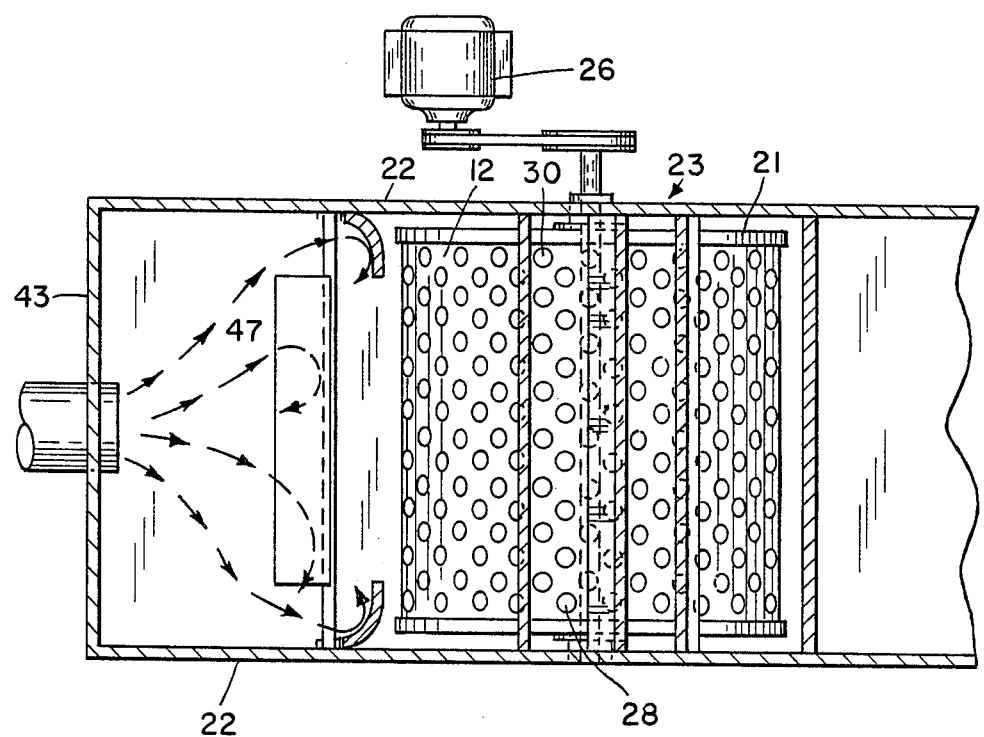
FIG. 5 is a top view somewhat enlarged of only a portion of FIG. 1.

The rolls 10, 11, and 12 may be closed to the axial ends by being fastened to and sealed to end plates 21 as best seen in FIG. 4 in turn sealed by close fit to the sides (one side wall 22 only being partially shown in FIG. 4 broken away and displaced outwardly for purposes of illustration only) of a mounting cabinet or housing 23. The rolls 10, 11 and 12 may be in the form of perforated rolls, as illustrated, of circularly cylindrical form; there may be mounted at one side a probe 25, or the like to test the consistency of the liquid. Any suitable means, such as drive motor 26 drives the rolls and they are held in suitable bearings (not illustrated). Suitable packings (also not shown) may be provided as a gas seal between the roll end plates 21 and side walls 22.

The perforations or openings 28, 29, and 30 respectively of rolls 10, 11 and 12 are each less in span than the maximum span supported by the surface tension of the liquid of the bath 20. The reason is that as the gas or smoke is forced through the perforations, or openings, the gas should come in close contact with the liquid.

Figure 3:
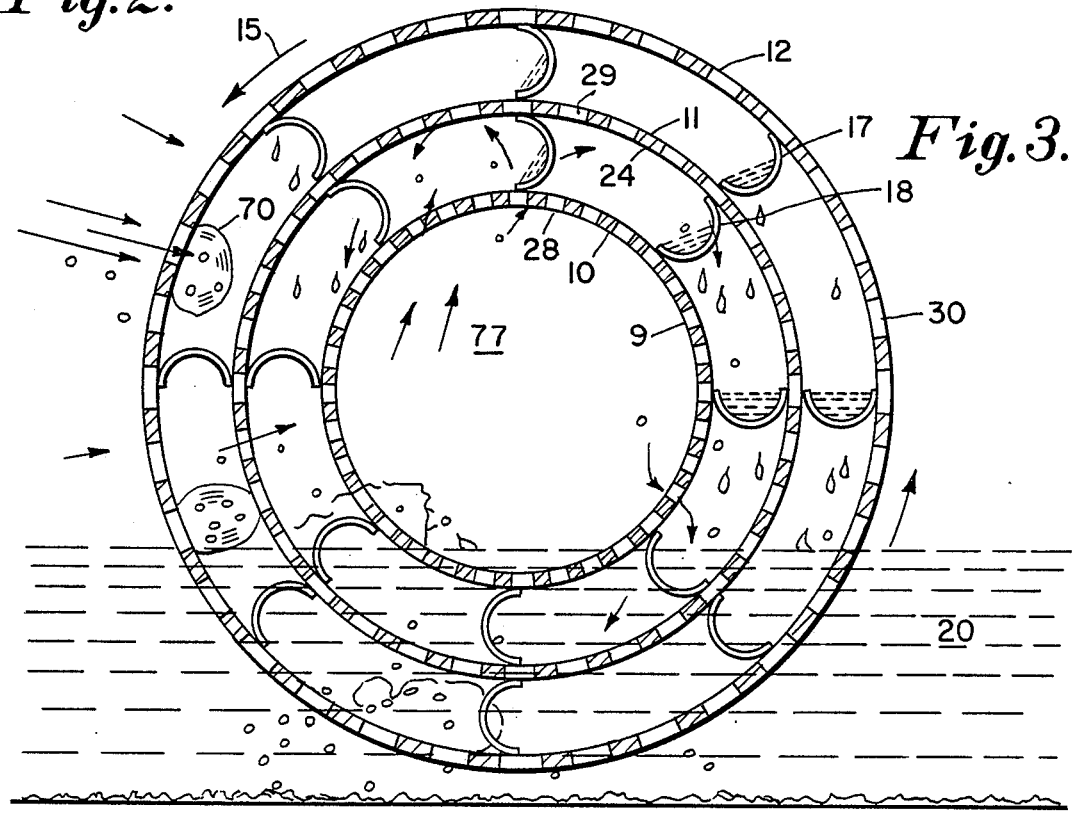
FIG. 3 is a side cross-sectional view, somewhat schematic and enlarged for explanatory purposes, of the rolls illustrated in FIGS. 1 and 2.

As best seen in FIG. 3 a chemical combination chamber 77 is formed inside the innermost roll 9. If the liquid closes the opening as it will if its surface tension supports a liquid film of greater maximum span than the span of the opening, then the gas or smoke must force its way into and travel through the liquid, promoting close contact with the liquid. As the gas and impurities travel through each perforation a bubble 70, as best shown in FIG. 3 is formed. As the bubble is formed with smoke and impurities it enlarges and when it is broken by the force of the smoke and and impurities it washes back into the bath 20, thereby promoting washing and chemical reaction. Further, the film of liquid, if broken, is reformed immediately because of the surface tension.

The housing or cabinet 23 includes the bath 20, which may be fed by an inlet 32. The bath has an overflow outlet 33 to draw off the floating particles 37, and a draw-off valve 34 from which liquid may be removed from the bottom 35 of the bath to an overflow vat 36. With an adequate supply of liquid fed into the inlet 32 the level of the liquid is maintained as the excess liquid and floating particles 37 flow out of the overflow 33.

The smoke or effluent 38 to be washed or "scrubbed" flows from a flue 40 as the product of burning in a furnace 41 directed downward against the surface 42 of the bath of liquid. The housing or cabinet 23, is totally closed except for the flue 40 sealed into a transverse end wall 43 of the cabinet 23 and except for a smoke outlet or chimney 44 sealed into the housing 23 at an upper wall or top 46 on the other transverse side of the rolls 10, 11, and 12.

An inlet deflector 47 which is downwardly curved is attached to the side wall 22 and deflects the smoke 38 and any particles 37 downward towards the surface of the bath.

A second deflector 49 is gently curved and also extends from the axial side wall 22, and from the top 46 to below the surface 42 at 53, but not to the bottom 48, thereby forming a first deceleration chamber 50 whereby the smoke 38 is forced through the surface of the water around the lower portion 53 of second deflector 49 and is thereby further washed.

A main deceleration chamber 54 contains the rolls 10, 11, and 12. The main deceleration chamber 54 comprises a receiving or inlet deceleration chamber 55, a second deceleration chamber 56, a third deceleration chamber 57, and a discharge or outlet deceleration chamber 58. The bounds of the inlet deceleration chamber 55 are the second deflector 49, the surface 42 of the bath 20, the outside front surface 59 of the outside roll, and the axial side walls, and a third deflector 60 which depends downwardly from the top 46 and may touch or bear against the surface of the outside roll in order to offer a substantial impediment to by-pass of smoke. This inlet deceleration chamber 55 is sealed for the most part so that there is very little leakage of smoke and as a result the smoke takes the path 61 of less resistance and travels through the front surface 59 of the outside roll and the surfaces of any succeeding or synchronous rolls.

The bounds of the second deceleration chamber 56 are the third deflector 60, the top 46, the outside surface 59 of the outside roll and a fourth deflector 63 which depends downwardly from the top 46 and may touch or bear against the surface of the outside roll in order to offer a substantial impediment to by-pass of smoke. This second deceleration chamber 56 is also sealed and as a result of the angle of deflector 63 the back pressure forces the smoke and other particles to take a path 61 through the surface 59 of the outside roll and the surface of any succeeding rolls.

The bounds of the third deceleration chamber 57 are the fourth deflector 63, the outside surface 59 of the outside roll and a fifth deflector 65 which depends downwardly from the top 46 and may touch or bear against the surface of the outside roll in order to offer a substantial impediment to by-pass of smoke. This third deceleration chamber 57 is also sealed and as a result of the angle of deflector 63 and deflector 65, the smoke and any particles left are forced to take a path also noted as 61 through the surface 59 of the outside roll and the surfaces of any succeeding rolls.

The bounds of the outlet deceleration chamber 58 are the fifth deflector, the top 46, a sixth deflector 68, the surface 42 of the liquid and the surface 59 of the outside roll. Because of the draft of the chimney 44, the path 69 of washed and scrubbed smoke, now clean air is under the end of deflector 68 and into the condensation chamber 66, and then up the chimney and into the atmosphere. The top 46 comprises a condensing effect on the vapors, which are converted into liquid eliminating the liquid loss in the condensation chamber 66.

A suitable means is employed to conduct the effluent or smoke from the flue 40 and first deceleration chamber 50 through the bath or liquid 20 into the receiving chambers 55, 56, 57 or 58, through the surface of the wetted rolls, and then up the chimney 44. The height of the chimney 44 alone may afford sufficient means by draft, but preferably a more positive means such as a blower 71 is installed in the chimney to assure adequate pressure differential between chambers and outlet deceleration chamber 58 to assure the desired flow of smoke. The chimney 71 has a cover to contain the condensation.

Figure 6:
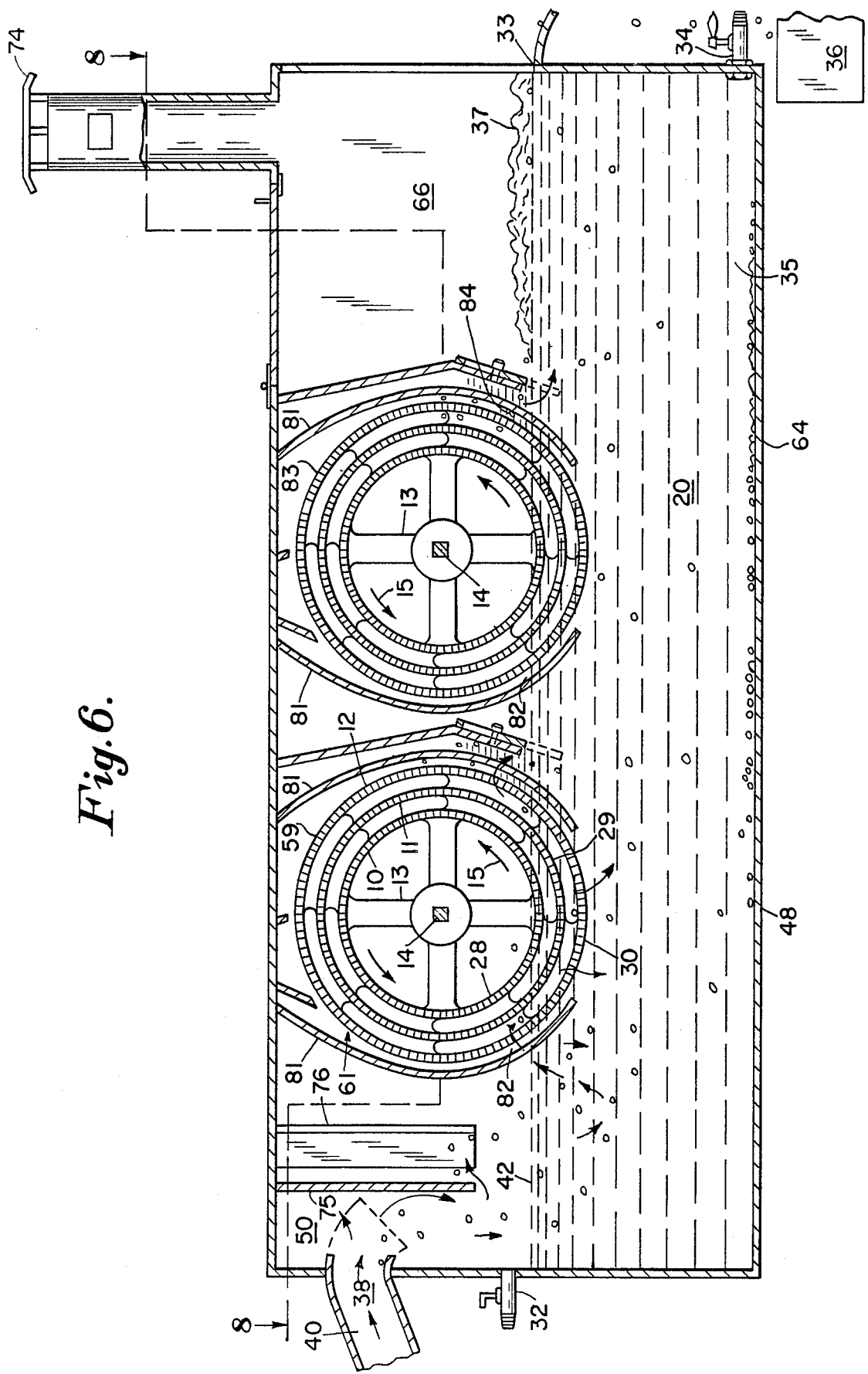
FIG. 6 is a side view of another embodiment of the invention showing two synchronous rolls.
Figure 7:
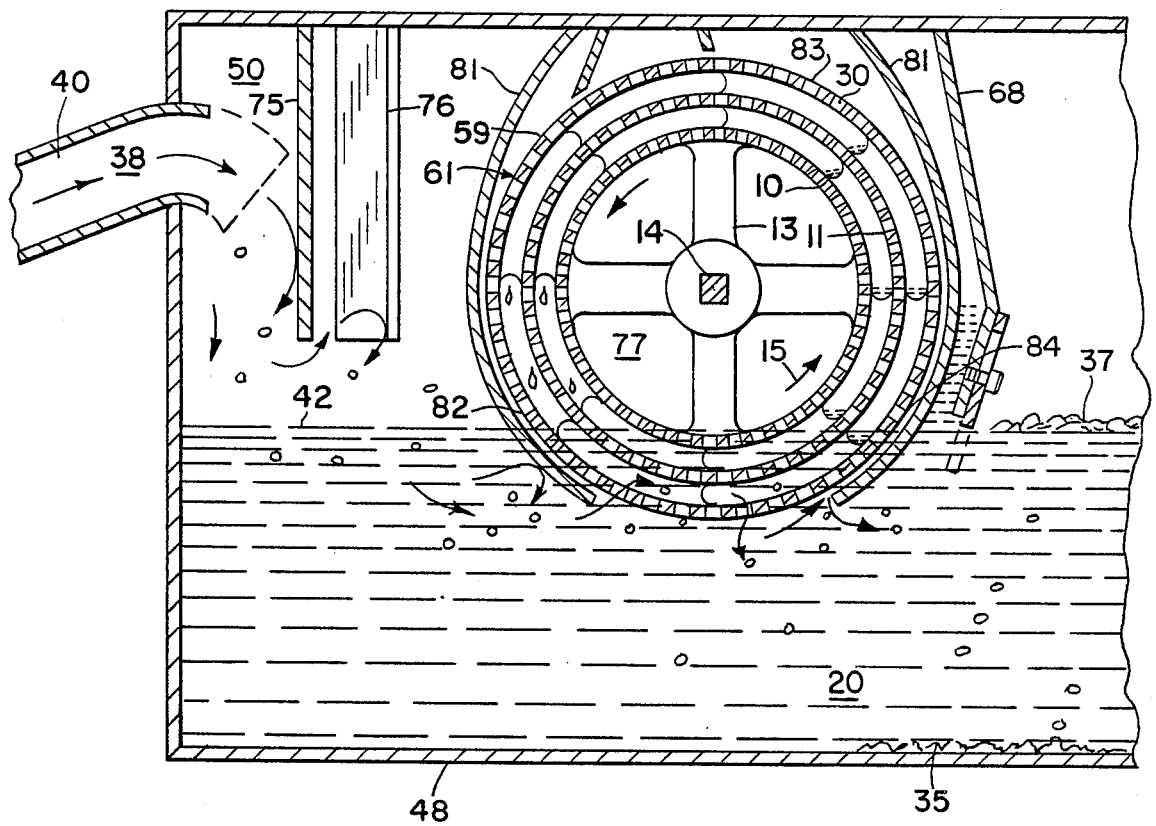
FIG. 7 is a side view of another embodiment of the invention.

As best seen in FIGS. 6 and 7, another embodiment of the invention is one roll or two synchronous rolls (FIG. 6) which may operate in sequence, wherein there is a foreshortened inlet deflector 75 and a foreshortened second deflector 76 which ends above the surfaces of the water having a buffer 81 on each side of the roll which acts as a backwash and by washing the faces of the buffers thereby creates backwash curtains 82 and 84.

On the opposite side 83 of the second roll (FIG. 1) another back wash curtain 84 is formed which further washes the smoke as it travels through the deceleration chambers.

FIG. 8 is a top view of two synchronous rolls which are operable in sequence when there are two complete units which operate to clean the smoke as it passes therethrough.

In operation as the drive motor 26 and the blower or fan 71 is actuated the smoke flows from the flue 40 into the first deceleration chamber 50 and is directed downward onto the surface 42 of the liquid bath 20. The smoke penetrates the liquid bath 20 and is broken into bubbles to interact with the liquid bath 20 and any loose particles bounce off deflector 47 downward into the bath. After a brief initial period when the first deceleration chamber 50, becomes stabilized with smoke, most of the smoke flows under the lower portion 53 of deflector 49 and into the inlet deceleration chamber 55, then the smoke penetrates the perforations 28, 29, and 30 to the interior of the innermost roll. The smoke cannot by-pass any roll; for example, the space between rolls 12 and 11, because the complete axial length of the cups 18 between rolls 11 and 10 forces the smoke to pass through the perforations. Similarly, the cups 18 which extend the full axial length of the rolls require the smoke to pass through the perforations to the interior of the innermost roll, in this case roll 10. Similarly, the smoke is required by the pressure differentials created by means of blower 71 to pass from the interior of the innermost roll through perforations 30, 29, and 28 wherein the pressure of the various deceleration chambers forces the smoke through the perforations throughout the main chamber 54. In this connection each roll should have at least two cups at 180 degree intervals, and preferably at less than 120 degree intervals, but could have a plurality of cups. The cups 17, and 18 serve a dual function. First they pick up and spill the liquid from bath 20 onto the rolls and insure continued wetting during operation. Second they provide a guiding function requiring the smoke to travel from the chamber through the roll perforations of all the rolls to the interior of the innermost roll and from thence through the perforations of all the rolls to the outlet deceleration chamber.

The action of the cups and the spilling of the liquid forms a liquid curtain within the drum further cleansing the same and scrubbing the smoke. Furthermore, this wetting of the rolls and perforations is accomplished with great efficiency, because the high velocity of rotation of the rolls, such as is required in Schmieg, for example, is not required in the present apparatus, which may be operated at a much slower speed, as it is not required to throw the liquid by centrifugal force, which tends to be wasteful of energy.

Furthermore, as the liquid is splashed back to the bath as the cups are overturned, the liquid is splashed against buffers 81 thereby forming ascending back wash curtains 82 and 84 further cleaning the air as it travels therethrough.

In order to more fully wash, clean, and neutralize the smoke, the liquid of the bath 20 may be chemically treated to be essentially basic. Thus, any chemical components of the bath, such as sulphur dioxide, nitrous oxide, or chlorine which are by products of P.V.C. may be neutralized by chemical reaction, for example, with alkalined by calcium hydrate or the like, mixed in or dissolved in the bath 20. If deemed desirable the surface tension of the liquid may be enhanced by adding a soap solution or other suitable chemical to the bath 20. Particulate matter will largely be washed out as the gas or effluent passes through the liquid of bath 20 from the chamber 50 through the other deceleration chambers. Any sludge indicated at 64 resulting from the deposit of particulate matter by settlement or precipitation may be removed physically from time to time by opening cover 74 which has a hinge 73. Denser, but liquid, impurities may flow out at the draw-off 34. The overflow 33 carries off floating or lighter density particles 37. By controlling the addition of chemical neutralizing agents to the water or liquid of bath 20, the basic nature of the bath may be stabilized at a desired value and tested periodically by probe 25. The liquid of the bath 20 may be recirculated from a sump (not shown) if desired, and agitation means 39 may be provided to prevent the formation of large chunks of impurities and so that the operation may be substantially continuous for at least a substantial period of time.

Thus, the smoke is treated by its passage through the bath and also by passage through the front surface and the perforations thereon of the concentric drums or rolls and thence again through the rear surfaces of the perforations of the drums a number of times.

I claim:

1. A scrubber for scrubbing smoke or the like, comprising:
   an inlet for the smoke and an outlet for the smoke;
   a housing having a top, a bottom and sides;
   a liquid bath for a liquid in the housing;
   a main chamber in the housing;
   a roll mounted in the main chamber for rotation in one direction about the horizontal axis having perforations for the passage of the smoke and being only partially immersed in the liquid, the roll having axial ends sealed to the housing sides against smoke leakage;
   a rotary drive for the roll;
   baffle means to seal the roll against smoke flow at the top of the housing including a baffle extending from the top to the roll and from side to side in smoke sealing relation and other baffles extending from the top into the surface of the bath and from side to side in smoke sealing relation, the housing with the roll thereby forming a plurality of deceleration chambers;
   cups carried by the roll having concavities facing upward as they leave the bath and downward as they enter the bath in the direction of rotation, to pick up liquid and spill the liquid over the roll as it rotates, the cups extending the full axial length of the roll to prevent passage of smoke from the said chambers except through the roll perforations;
   a first of said deceleration chambers serving as an inlet chamber for conducting the gas from the gas inlet into and through the surface of the bath;
   the last of said deceleration chambers serving as an outlet chamber and conducting the gas into and through the surface of the bath to the gas outlet;
   means to propel the smoke from the gas inlet to the inlet deceleration chamber through the exterior of the roll perforations to the interior of the roll and thence out again through the perforations in the exterior of the roll to the outlet deceleration chamber and to the gas outlet;
   whereby the smoke is washed in its passage at least twice through the bath and through the wetted perforations.

2. A scrubber as claimed in claim 1, further comprising a second synchronous roll coaxially within the first roll and having axial ends sealed to the sides, and operating synchronously and by the same drive as, the first roll, the synchronous rolls carrying the cups between them.

3. A scrubber as described in claim 1 having means to form a continuous ascending liquid curtain formed on either side of the first roll to further wash the smoke as it travels therethrough.

4. A scrubber as claimed in claim 1 having an agitator means to agitate the liquid to prevent the formation of large chunks of impurities.

5. A scrubber as claimed in claim 1 wherein the main deceleration chamber has an inlet deflector to deflect the smoke towards the liquid.

6. A scrubber as claimed in claim 1 further comprising a plurality of side to side deflectors and a condensation chamber.

7. A scrubber as claimed in claim 1 having a probe for testing the quality of the smoke.

8. A scrubber as claimed in claim 1 having at least one buffer depending from the upper wall.

9. A scrubber for scrubbing smoke or the like, comprising:
   a gas inlet and a gas outlet;
   a liquid bath for a liquid in the housing;
   a plurality of sets of coaxial rolls mounted for rotation in one direction about the horizontal axis one inside the next outer one, the rolls having perforations for the passage of the smoke and being only partially immersed in the liquid, the rolls being sealed at their axial ends to the housing sides against smoke leakage;
   baffle means to seal the rolls against smoke flow at the top of the housing including a baffle extending from the top to the roll and from side to side in smoke sealing relation and other baffles extending from the top into the surface of the bath and from side to side in smoke sealing relation, thereby forming a plurality of deceleration chambers;
   cups between and carried by the rolls having concavities facing upward as they leave the bath and downward as they enter the bath in the direction of rotation, to pick up liquid and spill the liquid over the rolls as they rotate, the cups extending the full axial length of the rolls to prevent passage of smoke from the said chambers, except through the roll perforations;
   rotary drive means for the rolls,
   means to propel the smoke from the gas inlet to a first of said deceleration chambers into and through the surface of the bath thence through the chambers through the exterior of the outermost roll perforations thence through the perforations of the inner rolls successively to the interior of the rolls and thence out again through the perforations to the exterior of the outermost of the rolls to an outlet deceleration chamber and thence into and through the surface of the bath, and then to the gas outlet;
   whereby the smoke of any impurities are washed in their passages twice through the wetted perforations and twice through the bath.

10. A scrubber as claimed in claim 9, the rolls being cylindrical drums, each having a horizontal axis which is the horizontal axis of rotation, and means for forming a continuous ascending liquid curtain at an outermost roll.

11. A scrubber as claimed in claim 10, the liquid having a surface tension supporting a maximum surface span, the perforations on the drums having a maximum span less than the surface tension span.

12. A scrubber as claimed in claim 11, the said cups being in the form of spherical cylinders having axes parallel to the horizontal axis of the cylinders, there being one cup between successive rolls at least at 180 degree intervals about the rolls.

13. A scrubber as claimed in claim 12, the housing having a chamber separated from the outlet deceleration chamber by a plurality of deflectors extending from side to side and from the top into the main deceleration chamber into but not to the bottom of the liquid; and
   the inlet including a flue for supplying the smoke to the inlet deceleration chamber for entry into the liquid to pass through the liquid.

14. A scrubber as claimed in claim 13, further comprising a blower as the means for creating a pressure differential between the chambers.

* * * * *